Sept. 25, 1923.

R. T. GRIFFITHS

MOLD

Filed Sept. 25, 1922

Inventor:
Richard T. Griffiths,
By Spear Middleton Donaldson & Hall
Attys.

Sept. 25, 1923. 1,468,904
R. T. GRIFFITHS
MOLD
Filed Sept. 25, 1922 4 Sheets-Sheet 2
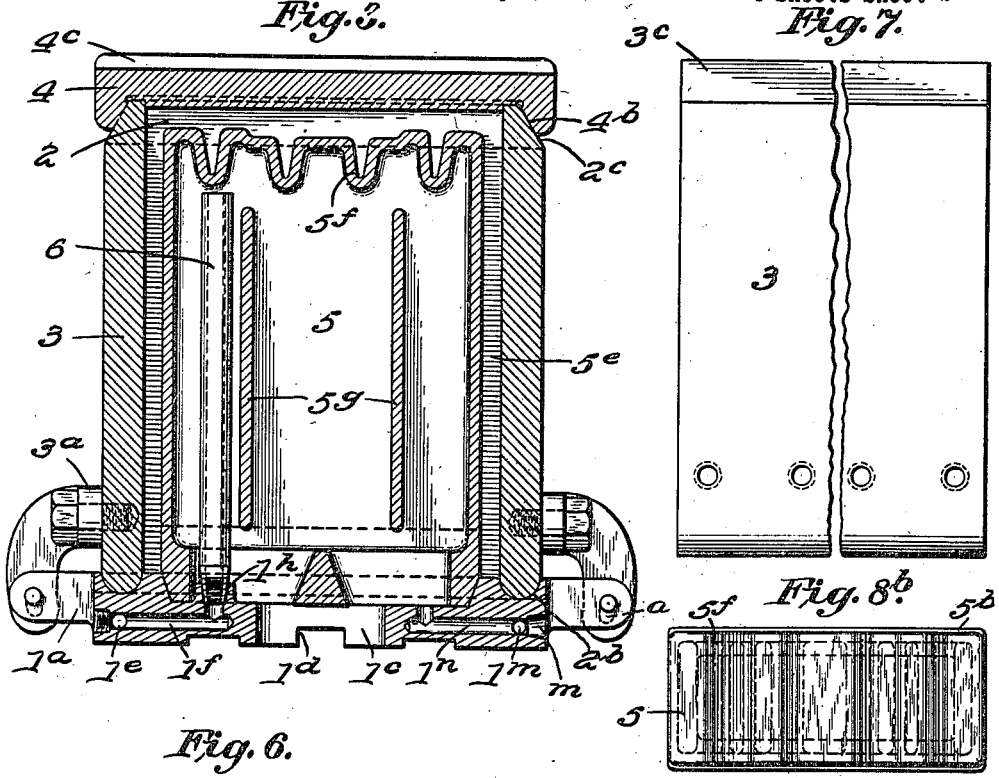
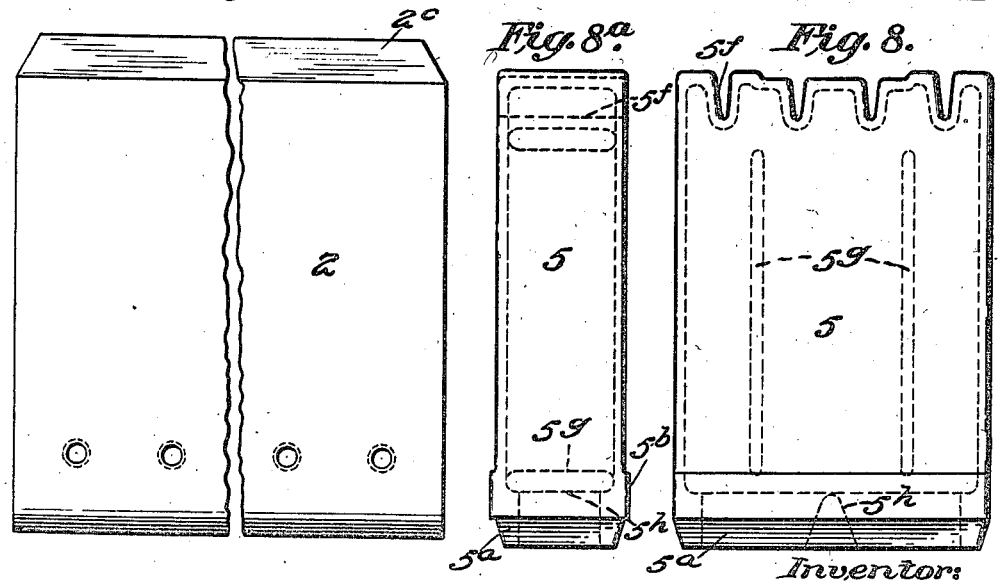
Inventor:
Richard T. Griffiths,
by Spear Middleton Donaldson & Hall
Attys.

Sept. 25, 1923.  1,468,904
R. T. GRIFFITHS
MOLD
Filed Sept. 25, 1922  4 Sheets-Sheet 3

Inventor:
Richard T. Griffiths,
by Spear Middleton Donaldson & Hall
Attys.

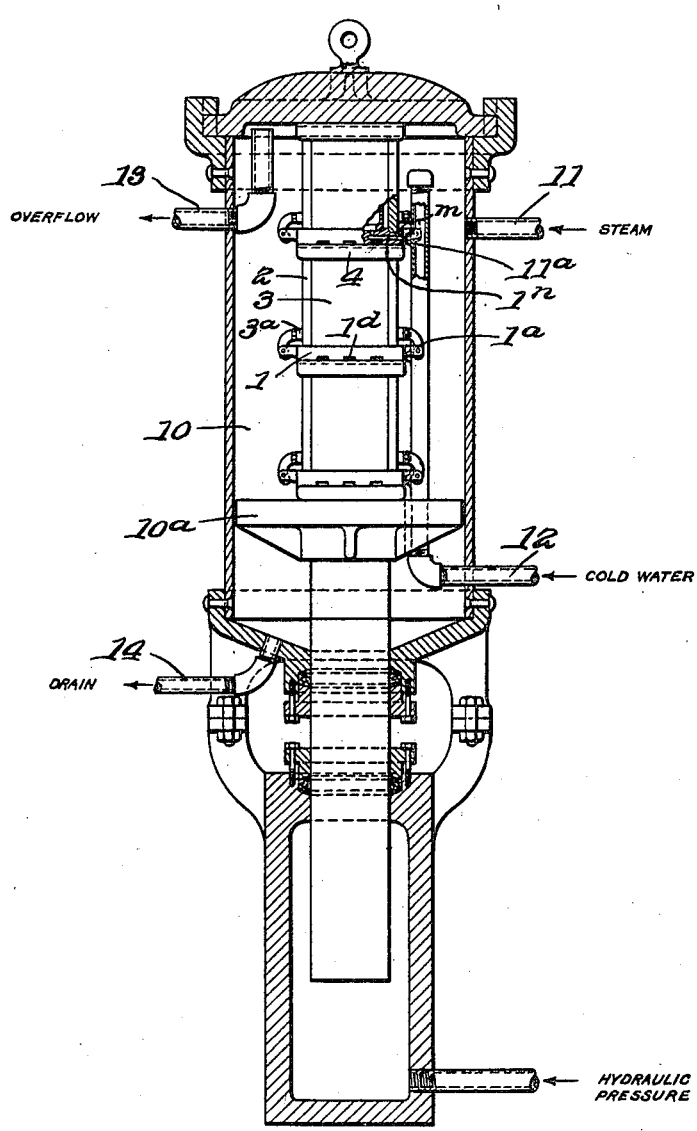

Patented Sept. 25, 1923.

1,468,904

UNITED STATES PATENT OFFICE.

RICHARD T. GRIFFITHS, OF AKRON, OHIO, ASSIGNOR TO THE MILLER RUBBER COMPANY, OF AKRON, OHIO, A COMPANY OF OHIO.

MOLD.

Application filed September 25, 1922. Serial No. 590,471.

*To all whom it may concern:*

Be it known that I, RICHARD T. GRIFFITHS, a citizen of the United States, and a resident of Akron, in the county of Summit and State of Ohio, have invented certain new and useful Improvements in Molds, of which the following is a specification.

My present invention relates to improvements in molds designed for use in the manufacture of hard rubber battery jars or boxes, and especially boxes the walls of which, while having smooth, imperforate faces, have their interiors of cellular or spongelike formation.

The invention aims to provide a simple, economical and durable construction which may be easily manipulated, to wit, assembled and disassembled or closed and opened, and which when closed will have its parts held together with sufficient firmness and tightness to withstand the pressure generated during vulcanization without the use of clamping bolts or similar fastening means.

The invention further aims to provide a construction of mold which may be subjected to the curing heat by stacking a plurality of molds in a vulcanizing press or heater and the movement of the press ram utilized to produce pressure on the jars on all sides.

The invention also aims to provide means for freely admitting steam to the core for curing, and cooling fluid at the completion of the vulcanization, for the purpose of chilling the article uniformly, prior to its removal from the mold.

With these and other objects in view, the invention includes the novel features of construction and arrangement and combination of parts hereinafter described, the nature and scope of my invention being defined and determined by the appended claims.

An embodiment of my invention is illustrated in the accompanying drawings, in which:—

Fig. 3 is a sectional view of the device of Fig. 1.

Figs. 6 and 7 are detail views of the end and side wall members respectively.

Figure 1:
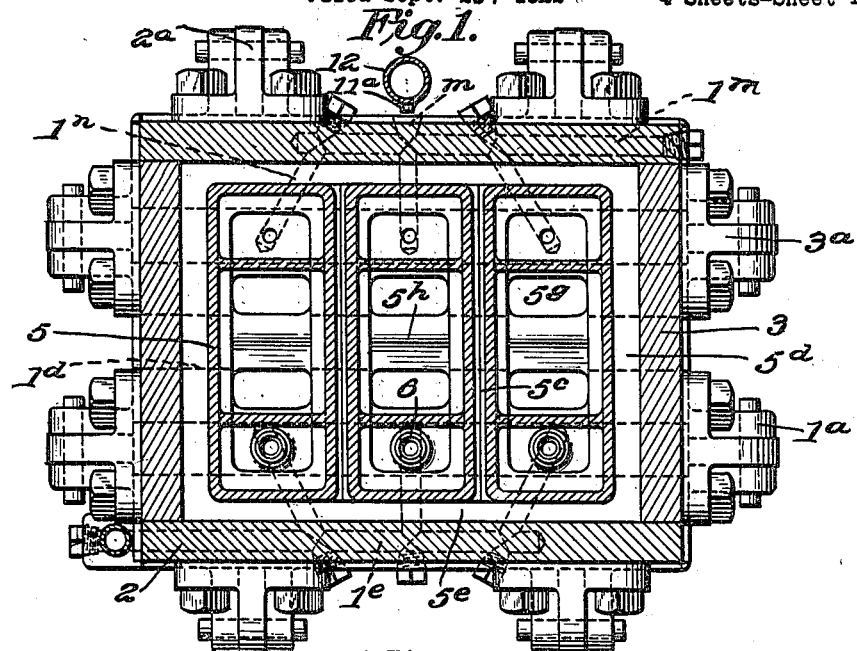
Figure 1 is a plan view of the mold with the top or cover member removed.
Figure 2:
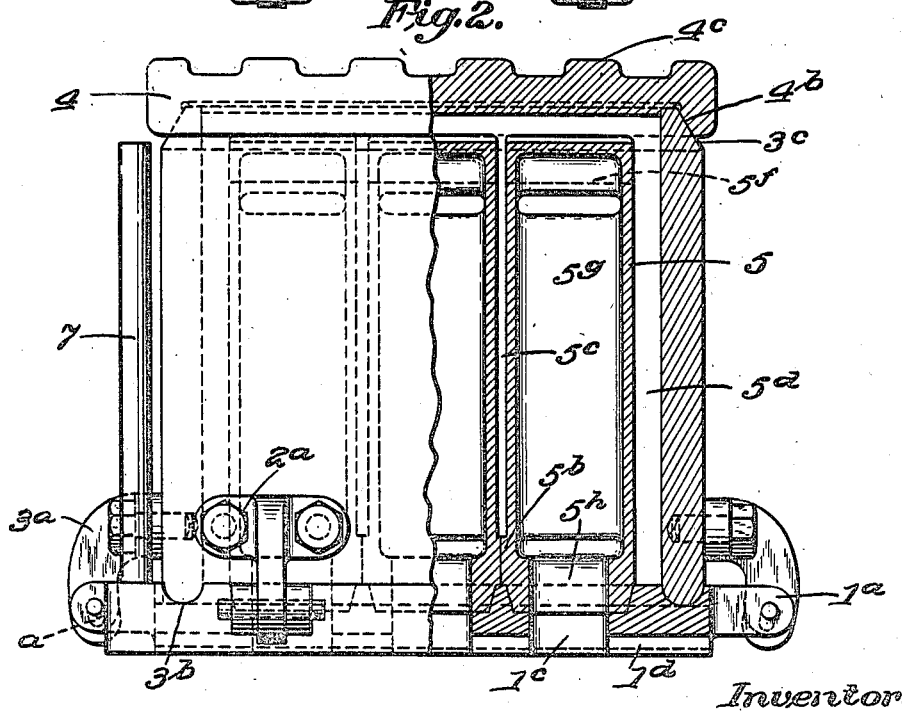
Fig. 2 is a view partly in side elevation and partly broken away.
Figure 4:
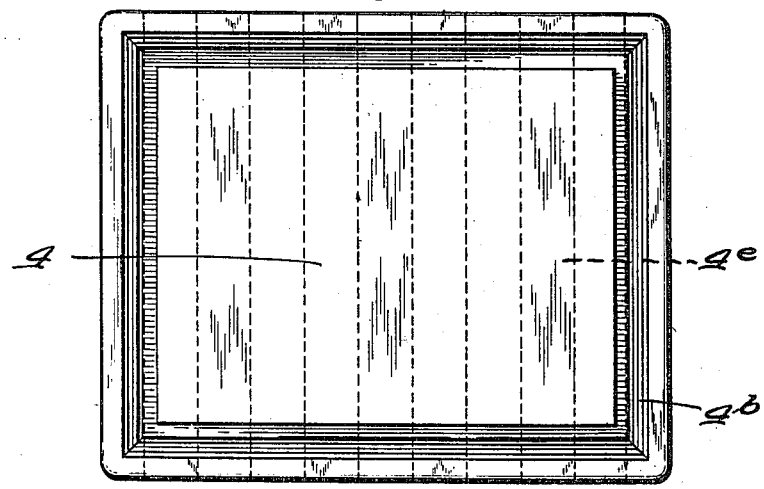
Fig. 4 is a plan view of the under face of the cover member.
Figure 5:
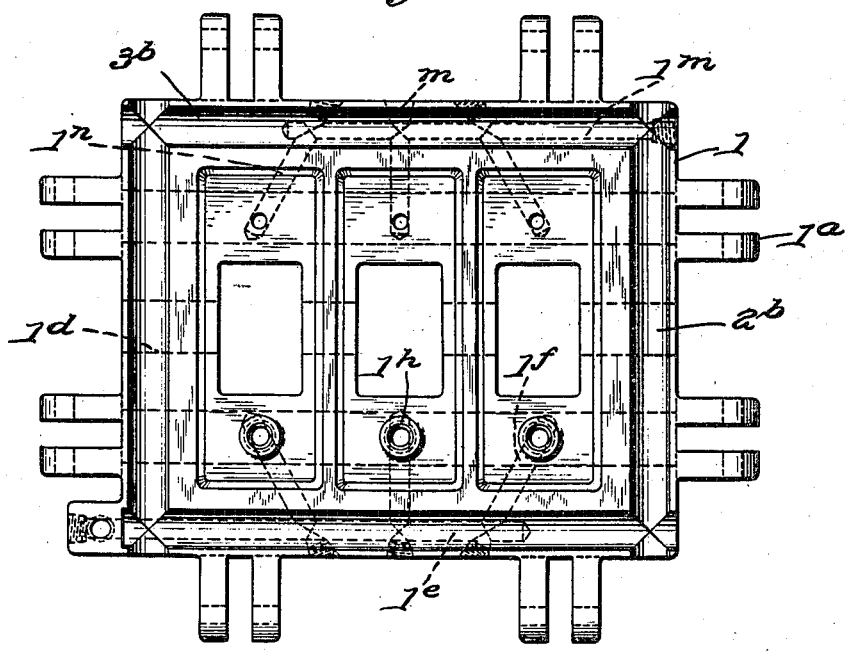
Fig. 5 is a plan view of the bottom member.

Figs. 8, 8$^a$ and 8$^b$ are side, end and plan views respectively of one of the cores, and Fig. 9 is a sectional view of a conventional nature, showing a press with a plurality of molds therein.

Referring by reference characters to these drawings, the numeral 1 designates the bottom of the box, which is provided upon its four sides with means for hingedly connecting the side and end walls 2 and 3 respectively, such means comprising spaced or bifurcated lug members 1$^a$ (preferably formed or cast integral with the bottom), between which spaced lugs are pivotally mounted brackets 2$^a$ and 3$^a$ which in turn are secured to the side and end walls by suitable means, as for example the screw bolts illustrated. The brackets are connected to the lugs by a lost motion pivotal connection, preferably by having the pivot pins pass through elongated slots $a$ in the brackets.

The lower edges of the side and end walls are preferably rounded or approximately semi-circular in cross section, and the base is channeled to receive these rounded edges, as indicated at 2$^b$ and 3$^b$, and due to the offset hinges the edges move into and out of these channels with an approximately lengthwise movement at the completion of the closing or beginning of the opening movement of the wall sections. The upper outer edges of the wall members are beveled as indicated at 2$^c$ and 3$^c$.

The cover or top closure member is indicated at 4 and is provided on its under face with grooves to receive the top beveled edges of the wall members, the outer walls of the grooves being correspondingly beveled as indicated at 4$^b$, and said beveled walls being preferably widened as shown by providing the cover member with a thickened marginal portion or flange. The top of the cover may be provided with cross strengthening ribs or flanges 4$^c$ which also facilitate the flow of steam and water when the molds are stacked, as hereinafter described.

By the arrangement described, after the side and end walls have been brought together, the cores and rubber compound having been placed in the mold, the forcing of the cover downward by suitable clamping means causes the inclines 4$^b$ cooperating with the beveled edges of the wall sections to draw these latter together with a wedging action and force their vertical edges together with a similar wedging action, so that a perfectly tight closure is effected. During such closing action the wall sections fulcrum on their rounded bottom edges.

The battery jars herein referred to are usually made of multicelled form, and may be adapted to form any number of cells, three being the number selected for purposes of illustration.

To effect this multiple cell or compartment formation, core members 5 are provided for the admission of heating steam and cooling water, which are hollow, and which have beveled lower ends $5^a$ adapted to be seated in correspondingly shaped recesses in the base. The two outermost cores are provided with shouldered portions $5^b$ on one side and the intermediate core with such shouldered portions on both sides, thus providing transverse spaces $5^c$ between the cores which form the transverse webs or walls which divide the jar into cells, and wider spaces $5^d$ between the end walls, and as the cores are shorter than the width of the interior width of the mold, corresponding spaces $5^e$ are left between the ends of the cores and the side walls of the mold, these spaces $5^d$ and $5^e$ forming the side and end walls of the jar respectively.

The jar is formed bottom upwards in the mold to facilitate the drawing out of any water of condensation during vulcanizing, and the entrance and removal of the cooling liquid. Such jars have cross ribs or bridges on their bottoms to support the battery plates, and to provide for these the upper edges of the cores are provided with grooves, as indicated at $5^f$.

As considerable pressure is generated within the mold during vulcanization, and as it is desirable to have the core walls comparatively thin for the ready transfer of heat and cold, the cores are constructed with transverse bracing webs $5^g$, which terminate short of the tops and bottoms of the cores to leave passages around the ends of the webs for fluid circulation, and a further connection between the beveled portions of the core walls is provided at $5^h$.

The base 1 is provided with a plurality of relatively large openings $1^c$ which coincide with or overlap the openings in the lower ends of the cores, and the outer surface of the mold bottom is provided with a longitudinal channel $1^d$ which, together with the ribbed formation of the top, permits ready flow of the treating fluid to and from the interiors of the cores when a plurality of the molds are stacked or piled one on the other in the heater.

To permit the interior of the mold to be freely vented, the base is provided with a longitudinal passage $1^e$ in its edge portion, from which lead branches $1^f$ which communicate with ports having threaded portions, indicated at $1^h$, into which are screwed vent pipes 6.

The passage $1^e$ leads to one end of the mold (its open end being closed by a screw plug), and it communicates at this end with a similar vertical pipe 7 which extends upward to approximately the top of the mold.

When a plurality of filled molds have been stacked on each other and placed in a heater, such as indicated at 10 in Fig. 9, they are all held tightly closed by the usual heater ram $10^a$, and when steam is turned on through supply pipe 11, it surrounds the molds and also finds free entry to the interior of the cores, whereby the rubber in the mold cavity is uniformly heated. After the curing is complete, cold water is admitted to the heater chamber through supply pipe 12, for chilling purposes and as it rises in the hollow cores these are vented by the vent pipes in a manner which will be readily apparent from the foregoing description.

I have found that the best results are secured if water is injected into the core passages to condense the steam within the cores prior to their being filled by the rising of the water in the press chamber. To accomplish this, the opposite edge of the base is provided with a channel $1^m$ having an intake port $m$, and branch passages $1^n$ terminating or discharging at their lower ends into the lower ends of the core sections. The water supply pipe 12 extends upward within the press chamber, passing through an opening in the press ram, and is provided with jet openings or nozzles $11^a$ which align with the intake ports $m$ when the superposed molds are clamped by the press.

After vulcanization is complete, cold water is turned into the heater through the jet pipe so that a jet of water strikes each mold, whereby they are all cooled at the same time. This jet being in alignment with a mold intake opening, the steam in the opening is immediately condensed forming a vacuum which assists the water in entering this opening. The water entering is projected against the interior of the cores thereby cooling them quickly. As the water accumulates in the heater it rises and completely covers the molds. As this occurs, the vents allow the air to escape so that the molds may be completely filled. The overflow pipe 13 in the heater is turned up so that its opening is above the highest mold. A drain pipe is provided as indicated at 14.

By hinging the mold plates to the base all danger of injury to their inner or article shaping faces, is avoided, which is important as such faces are highly finished, and when such plates are independent their operating faces are liable to be brought into contact and scratched or marred.

The lost motion or slotted connection of the wall members with the base allows a slight hinging action of the side plates in the circular grooves, or in other words, allows the curved edges of the plates to fulcrum in the grooves under the clamping action of the top plate, and said lost motion connection also facilitates the opening of the mold and removal of the article in that, after the removal of the top plate, the wall plates and jar may be lifted bodily together to a slight degree from the bottom plate, and the wall plates thereafter swung outwardly on their pivots.

Having thus described my invention, what I claim is:—

1. A mold for the purpose described, comprising a base, lugs projecting from the lower edges thereof, said base having grooves in its upper face near its edges, side wall members having their lower edges adapted to seat in said grooves and having brackets pivotally connected to said lugs by a lost motion connection, and a cover member removably engaging the upper edges of said wall members.

2. A mold for the purpose described, comprising a base, core members removably carried by the base, said base having semi-circular grooves near its margins, wall members having curved lower edges fitting said grooves, hinges connecting said wall members to the base with a lost motion connection, and a cover member constructed and adapted to draw the upper edges of said wall members inward toward the center of the mold.

3. A mold for the purpose described, comprising a base, lugs projecting from the lower edges of the base, said base having grooves in its upper face near its edges of semi-circular shape in cross section, wall members having curved lower edges adapted to seat in said grooves and having brackets overlapping said lugs, said brackets and lugs constituting hinge members, one set of hinge members having elongated openings or slots and hinge pins carried by the other members and engaging said slots, and a cover member removably engaging the upper edges of said wall members.

4. A mold for the purpose described, comprising top and bottom and wall members, said bottom having an opening, a hollow core having an open bottom communicating with said opening, and a vent pipe within said core having a discharge through said base.

5. A mold for the purpose described, comprising top and bottom and wall members, said bottom having an opening, a hollow core having an open bottom communicating with said opening, a vertical vent pipe within the core, and a vertical vent pipe carried by the base outside the wall members, said base having a passage connecting said vent pipes.

6. A mold of the character described, comprising a bottom member, wall members hinged thereto, said bottom having an opening, a hollow core carried by said base having an open bottom communicating with said opening, said base having a projection at one corner, a vertical vent pipe carried by said projection in position to clear the wall members in their hinging action, a vent pipe carried by the base within the core, said base having a passage connecting said pipes, and a cover member cooperating with said wall members.

7. A mold of the chracter described, comprising a base, wall members, and a cover member, said base having an opening, a hollow core carried by said base and having an open lower end communicating with said opening, said base having a channel in its under face intersecting said opening, and the cover member cooperating with said wall members.

8. A mold of the character described, comprising a base, wall members, and a cover member, said base having an opening, a hollow core carried by said base and having an open lower end communicating with said opening, said base having a channel in its under face intersecting said opening, and the cover member cooperating with said wall members, said cover member having transverse grooves in its upper face.

9. A mold of the character described, comprising a base having an opening, wall and top members cooperating with said base to form a mold cavity, a hollow core within said cavity having an open lower end and aligning with said opening in the base, said base having a lateral passage in its wall communicating at its inner end with said opening.

In testimony whereof, I have affixed my signature.

RICHARD T. GRIFFITHS.